Aug. 11, 1925.

D. L. MILLSAP

PIG WEANER

Filed March 27, 1925

1,549,598

INVENTOR
David L. Millsap.
BY
ATTORNEY

Patented Aug. 11, 1925.

1,549,598

UNITED STATES PATENT OFFICE.

DAVID L. MILLSAP, OF POWERSVILLE, MISSOURI.

PIG WEANER.

Application filed March 27, 1925. Serial No. 18,757.

*To all whom it may concern:*

Be it known that I, DAVID L. MILLSAP, a citizen of the United States, residing at Powersville, in the county of Putnam and State of Missouri, have invented certain new and useful Improvements in Pig Weaners; and I do declare the following to be a full, clear, and exact description of the invention, such as will enable others skilled in the art to which it appertains to make and use the same, reference being had to the accompanying drawings, and to the figures of reference marked thereon, which form a part of this application.

This invention relates to pig weaning apparatus and particularly to a shield and harness therefor, adapted to prevent the little pigs from having access to the nipples of the sow.

A pig weaner, must of necessity, be constructed entirely different from weaners for other animals since the nipples run nearly the entire length of the under side of the body of the animal. It it difficult to keep a shield attached to the animal because a swine has a body of almost uniform diameter.

Figure 1:
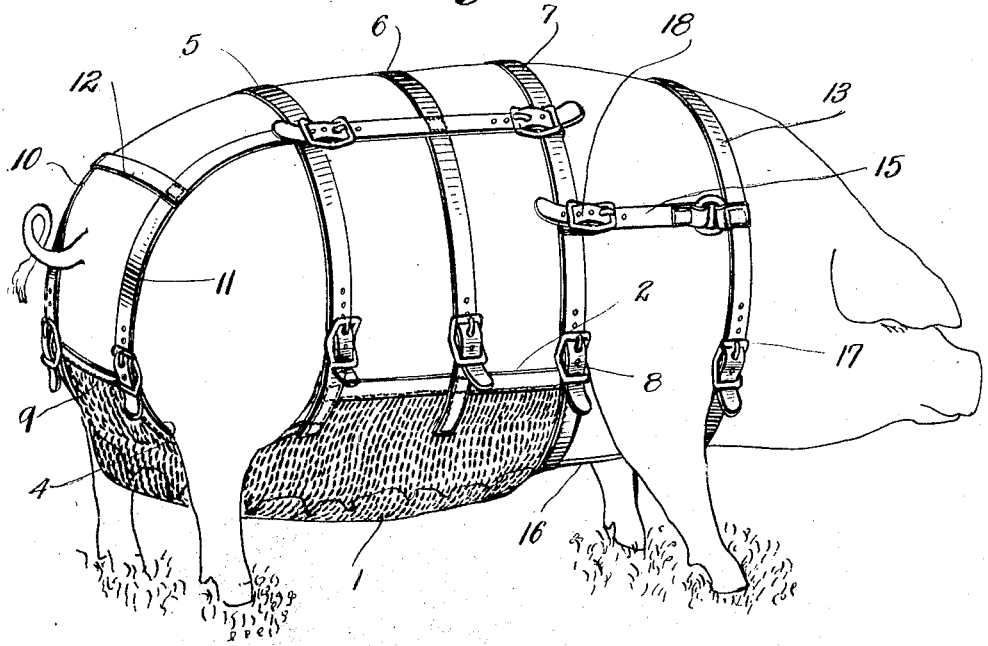
Figure 2:
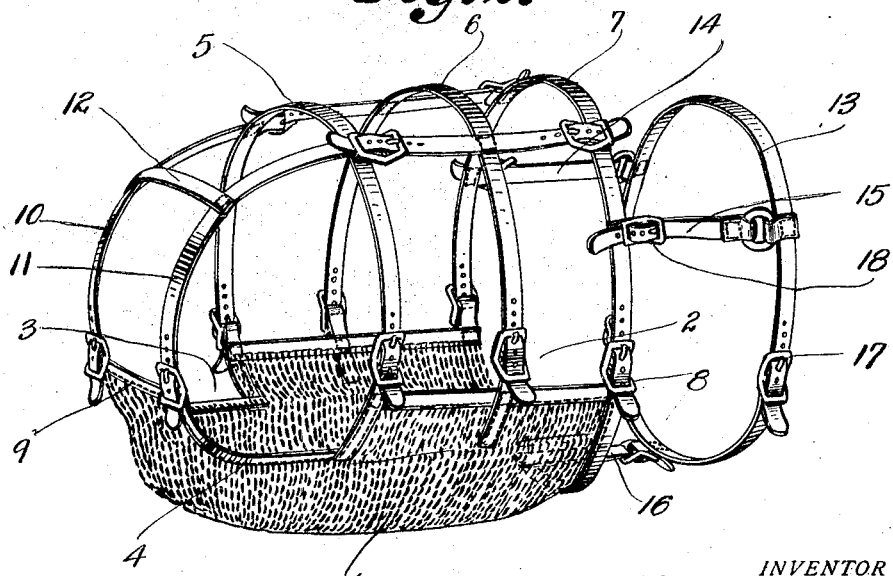

The novelty of my invention will be clearly understood by reference to the following description in connection with the accompanying drawings, in which Fig. 1 is a perspective view of a swine to which my invention is applied, and Fig. 2 is a perspective view of the pig weaner detached.

The shield is shown as consisting of a bag like device 1 slit longitudinally as at 2 to receive the body of the sow. The rear corners of the shield are cut away as at 3 and 4 to receive the rear legs or thighs of the animal. The shield preferably consists of a fabric or mesh to permit ventilation.

In order that the shield may be securely fastened to the animal and supported between the front and rear legs I provide a harness consisting of the three transverse back straps 5, 6 and 7 adjustably fastened to the side edges of the shield by buckles 8. The rear end 9 of the shield is held up by two longitudinal straps 10 and 11 which are connected to the transverse straps 5, 6 and 7 and which are connected one to the other at the rump by a cross strap 12. The strap constitutes a surcingle just back of the front legs of the animal, while the strap 5 is just in front of the rear legs, the strap 6 being between the straps 5 and 7. All three straps support the shield. The neck strap 13 fits around the front legs and it is connected to the transverse straps 7 by the longitudinal straps 14 and 15 and to the shield by a longitudinal strap 16. The neck strap 13 is provided with an adjustable buckle 17. The straps 14, 15 and 16 also have buckle adjustments generically designated 18.

Since the sow will wallow in damp ground it is essential that the shield be made of rust proof material so I recommend that the open mesh be made of any suitable rust proof material.

It will be seen from the foregoing that the weaner can be easily attached to the sow. It is adjustable and it will prevent little pigs from having access to the nipples and therefore the little pigs can be weaned.

What I claim and desire to secure by Letters-Patent is:—

1. A pig weaner for sows, comprising a horizontal shield to cover the nipples of the sow, a surcingle supported by the back of the sow, a collar strap for the sow connected to the surcingle, a back strap, an intermediate strap supported by the back of the sow and means connecting the upper edge of the shield to the surcingle, the back strap and intermediate strap.

2. A pig weaner for sows, comprising a horizontal shield to cover the nipples of the sow, transverse straps adjustably connected to the side edges of the shield to support the shield from the back of the sow, the transverse straps including a surcingle, a rear strap, and an intermediate strap, longitudinal straps to hold up the rear end of the shield between the rear legs of the sow, and a collar strap connected to one of the surcingle straps.

In testimony whereof I affix my signature.

DAVID L. MILLSAP.